United States Patent
Kitajima et al.

(10) Patent No.: US 6,559,876 B2
(45) Date of Patent: May 6, 2003

(54) IMAGE FORMING APPARATUS WITH EXPOSURE REDUCTION MODE

(75) Inventors: Kenichiro Kitajima, Ibaraki (JP); Yuichiro Toyohara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/935,830

(22) Filed: Aug. 24, 2001

(65) Prior Publication Data

US 2002/0044189 A1 Apr. 18, 2002

(30) Foreign Application Priority Data

Aug. 30, 2000 (JP) .................................... 2000-261308

(51) Int. Cl.[7] .......................... G03G 15/00; G03G 15/04
(52) U.S. Cl. .......................... 347/132; 347/140; 399/46; 399/138
(58) Field of Search ................................ 347/129, 132, 347/140; 358/300; 399/46, 51, 177, 138

(56) References Cited

U.S. PATENT DOCUMENTS 5,313,308 A * 5/1994 Hasegawa et al. .......... 358/300
5,453,773 A * 9/1995 Hattori et al. ............... 347/129
5,576,810 A * 11/1996 Aita et al. ................... 347/129
6,072,512 A * 6/2000 Fukasawa ................... 347/131

OTHER PUBLICATIONS

U.S. patent application Ser. No. 09/818,737, filed Mar. 28, 2001.

* cited by examiner

Primary Examiner—Joan Pendegrass
(74) Attorney, Agent, or Firm—Fitzpatrick, Cella, Harper & Scinto (57) ABSTRACT

An image forming apparatus includes an image bearing member for bearing a latent image and a charger for charging the image bearing member. The charged image bearing member is exposed to form the latent image and a developing unit develops the latent image. One of an exposure amount reduction mode for executing image formation by reducing an exposure amount and a normal mode for executing image formation with a normal exposure amount is selected. A correction amount of a look-up table for gradational correction is changed when the exposure amount reduction mode is selected.

10 Claims, 13 Drawing Sheets

RELATIONSHIP BETWEEN MOISTURE AMOUNT AND REQUIRED DEVELOPMENT Vcont

FIG. 3

RELATIONSHIP OF PHOTORECEPTOR CHARGE POTENTIAL Vd AND EXPOSURE UNIT POTENTIAL Vl WHEN ABSOLUTE MOISTURE AMOUNT OF CIRCUMFERENCE ENVIRONMENT CHANGES

FIG. 4

ELECTROPHOTOGRAPHY
PHOTORECEPTOR

FIG. 5

RELATIONSHIP OF EXPOSURE AMOUNT
AND POTENTIAL OF DRUM A

EXPOSURE AMOUNT AREA WITHOUT VL CHANGE, AND AREA OF VL POTENTIAL WHEN CHANGING POTENTIAL VD ON DRUM

FIG. 9

NORMAL MODE AND POTENTIAL ON DRUM AT THE TIME OF EXPOSURE AMOUNT REDUCTION

FIG. 10

NORMAL MODE AND POTENTIAL ON DRUM AT THE TIME
OF EXPOSURE AMOUNT REDUCTION
(FIGURE WHICH ARRANGED FIG. 9 ON SURFACE POTENTIAL STANDARD)

FIG. 11

DIFFERENCE OF IMAGE DENSITY TO INPUT SIGNAL AT THE TIME OF NORMAL IMAGE FORMATION AND EXPOSURE AMOUNT REDUCTION

ENVIRONMENTAL CHANGE OF PRINTER CHARACTERISTIC γ OF NORMAL IMAGE FORMATION EXPOSURE AMOUNT

FIG. 15

LUT TO PRINTER CHARACTERISTIC γ IN FIG. 13

IMAGE FORMING APPARATUS WITH EXPOSURE REDUCTION MODE

BACKGROUND OF THE INVENTION

1. Field of the Invention

The present invention relates to a color image forming apparatus for forming an image by an electrophotographic process such as a copying machine, a printer, a facsimile apparatus or the like.

2. Related Background Art

In the conventional image forming apparatus capable of forming a color image by an electrophotographic process, the image bearing member supporting toner on an electrostatic latent image is generally composed of a metal drum or a metal belt provided with a photosensitive layer composed of a charge generating layer and a charge transporting layer.

In such image forming apparatus, the image bearing member is driven in a predetermined direction in response to a print start signal and then is given a bias by a charging device (a corona charger, a charging roller or a member bearing magnetic particles or the like) whereby the surface of the image bearing member is charged or is subjected to charge injection to a predetermined potential.

The surface potential thus obtained is called a VD potential. Then the surface of the image bearing member is irradiated with light of a laser or a light emitting diode (LED) which is on-off controlled according to a signal from a controller (exposure). The potential is reduced in a portion irradiated with the light, whereby an electrostatic latent image is formed on the surface of the image bearing member. The potential of thus exposed portion is called a VL potential.

Then a bias (developing bias) is applied to a developing device opposed to the image bearing member and filled with toner to transfer toner bearing predetermined charge onto the electrostatic latent image on the image bearing member, thereby rendering the electrostatic latent image visible (development). The toner amount deposited on the image bearing member at the development is determined by the relationship between the aforementioned VL potential and the developing bias.

Then a bias of a polarity opposite to that of the toner on the image bearing member is applied to a transfer member, such as a transfer roller or a transfer belt, positioned adjacent to the image bearing member and moved in the same direction and in a substantially same speed as those of the image bearing member, and a transfer material is passed in such state between the transfer member and the image bearing member, whereby the toner carried on the image bearing member is transferred onto the transfer material.

In the image forming operation explained in the foregoing, the photosensitive layer of the image bearing member is affected not a little by the exposure memory effect by the irradiating light. More specifically, the VL potential after the exposure fluctuates by the history of use of the image bearing member. Such fluctuation leads to a fluctuation in the deposited toner amount, whereby the density of the printed image cannot be made constant.

In order to avoid such exposure memory effect, there is conventionally adopted a method of providing a suitable light source (pre-exposure light source) in the apparatus and executing so-called pre-exposure in which the surface of the image bearing member is exposed to the light from the pre-exposure light source prior to the charging operation of the image bearing member. However, such light source (pre-exposure light source) may not be provided in the apparatus as a result of recent compactization of the apparatus.

For this reasons, for realizing a compact image forming apparatus without the pre-exposure device but provided at least with a movable electrophotographic photoreceptor, charging means for charging the surface of the electrophotographic photoreceptor and exposure means for exposing the surface of the electrophotographic photoreceptor charged by the charging means thereby forming an electrostatic latent image, there is being proposed a method of taking a potential difference obtained in an area, where the potential attenuation in an exposed portion by a change of exposure amount of 0.1 ($\mu J/cm^2$) with respect to an arbitrary surface potential obtained by charging the photoreceptor becomes 50 V or less, as the maximum latent image contrast potential difference for such arbitrary surface potential, and selecting the image forming condition such as the developing potential within a range of the exposure amount where the potential difference becomes 60% to 90% of such maximum latent image contrast potential difference.

However, the above-described method of reducing the exposure amount to reduce the latent image contrast potential difference thereby correcting the developing condition such as the charging potential of the photoreceptor or the developing bias potential same as in the ordinary image forming condition allows to obtain a maximum density of the image forming apparatus same as in the normal condition, but, since the image formation is executed under a condition where the relationship between the charging potential of the photoreceptor and the exposure amount (E-V characteristics) is different from the normal, there will result a change in the intermediate density due to a change in the potential of the intermediate density area caused by a difference in the potential attenuation with respect to the exposure amount.

SUMMARY OF THE INVENTION

An object of the present invention is to provide a color image forming apparatus and a control method therefor, free from the aforementioned drawbacks.

Another object of the present invention is to provide an image forming apparatus and a control method therefor, capable of varying the density of the output image involving the intermediate density according to the difference in the potential attenuation, thereby providing image quality same as in the normal condition.

Still another object of the present invention is to provide an image forming apparatus and a control method therefor, capable of automatically correcting the intermediate density area so as to constantly providing a high quality image without the toil of the user.

Still other objects of the present invention, and the features thereof, will become fully apparent from the following description to be taken in conjunction with the accompanying drawings and from the appended claims.

DETAILED DESCRIPTION OF THE PREFERRED EMBODIMENTS

Now the present invention will be clarified in detail by preferred embodiments thereof with reference to the accompanying drawings.

(Embodiment 1)

Figure 1:
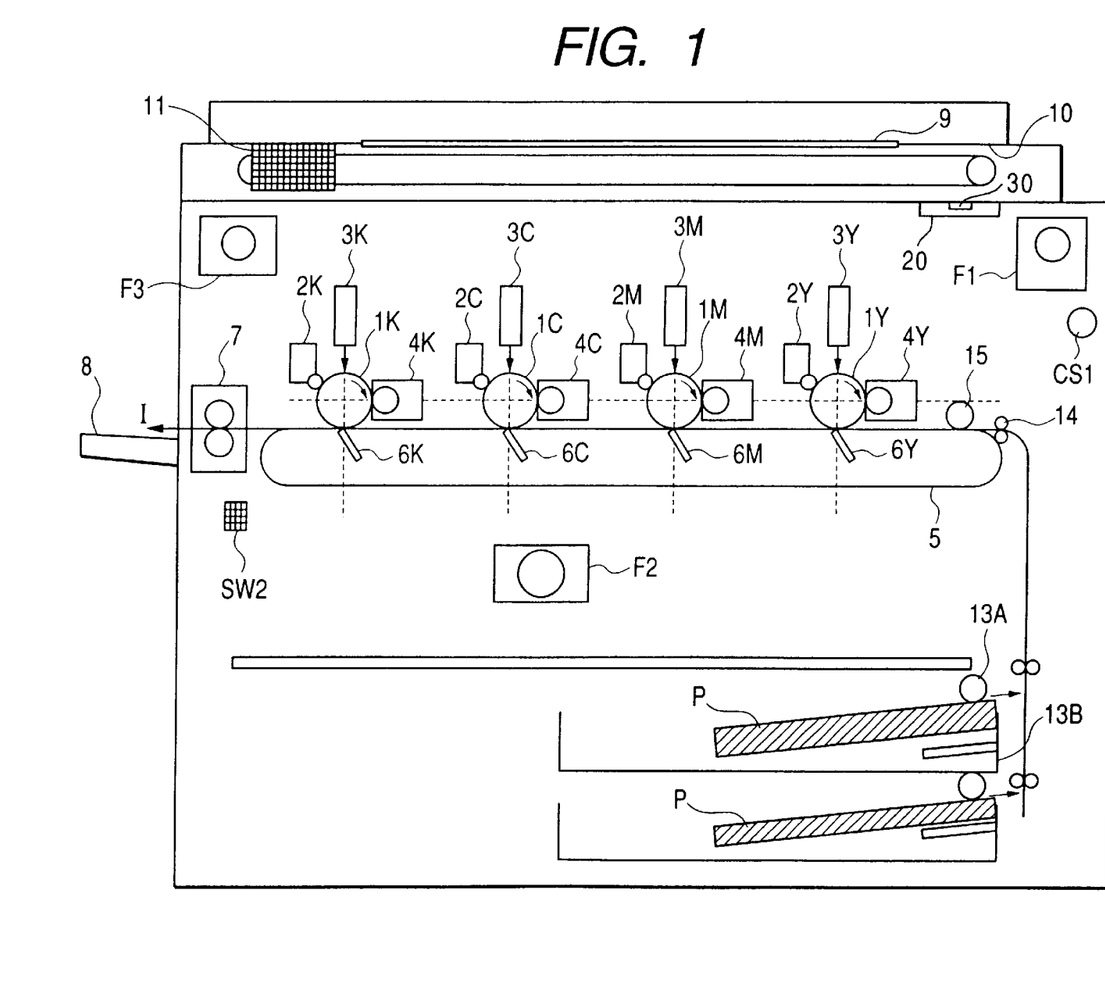
FIG. 1 is a view showing the configuration of a color image forming apparatus.

FIG. 1 is a view showing the configuration of an electrophotographic color copying apparatus employing an LED exposure device. However the present invention is also applicable to a monochromatic copying apparatus utilizing a laser beam exposure device.

The color image forming apparatus is provided with a digital image reader unit in the upper part and a digital color image printer unit in the lower part. In the reader unit, an original 9 is placed on an original support glass plate 10 and is scanned with a CCD sensor 11 to obtain color separation image signals. The color separation image signals are supplied through an unrepresented circuit, then processed in an unrepresented video processing unit and transferred to the printer unit.

In the printer unit, photoreceptor drums 1Y to 1K (hereinafter collectively called photoreceptor (photosensitive) drums 1) constituting image bearing (retaining) members are rotatably supported so as to rotate in a direction indicated by arrows, and an image forming unit composed of chargers 2Y to 2K (hereinafter collectively called chargers 2), developing stations 4Y to 4K (hereinafter collectively called developing stations 4), a transfer belt 5 etc. is provided around the photoreceptor drums 1.

The photoreceptor drums 1 are uniformly charged by the chargers 2 and are irradiated with optical images 12Y to 12K (hereinafter collectively called optical images 12) which are color separated by exposure devices 3Y to 3K (hereinafter collectively called exposure devices 3) composed of LED exposure devices or corresponding optical images to form latent images on the external peripheries. The electrostatic latent images on the photoreceptor drums 1 are then developed with the developing stations 4 into visible toner images.

When an original reading command is entered (normally when a copy key is depressed) or when the image forming apparatus functions as a printer (for example in response to a print job command from a PC), the temperature/humidity information of an environment sensor CS1 is read and the absolute moisture amount is calculated by a command of an unrepresented internal CPU provided in the image forming apparatus.

Figure 2:
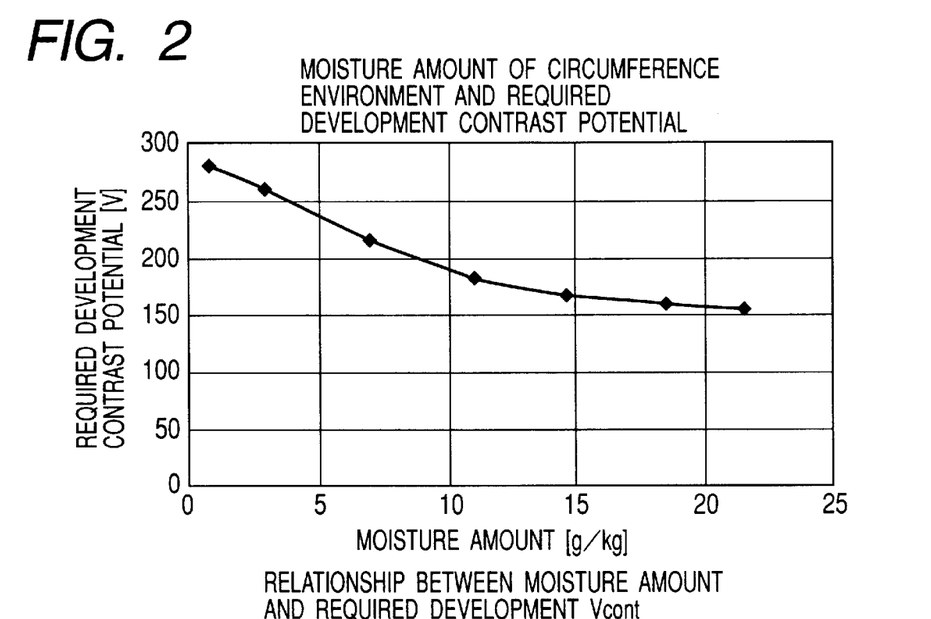
FIG. 2 is a chart showing the relationship between the moisture amount and the required development contrast potential.

Based on such absolute moisture amount, the CPU calculates the required development potential Vcont in such environment. The development potential Vcont varies according to the environment because the physical properties, such as the charging ability, of the toner employed in the developing station changes by the environmental moisture amount. The calculation of the developing potential Vcont is executed by a linear interpolation, according to the measured moisture amount, based on the relationship between the moisture content and the required development potential Vcont represented in FIG. 2 and stored in advance as a table.

In the following there will be explained, with reference to FIG. 3, a method for calculating the latent image potential and the developing sleeve potential of the developing station. As an example, if the environment sensor CS1 shown in FIG. 1 provides the temperature/humidity information of 23° C./5%, the moisture amount becomes about 1.0 (g/kg).

In such case, based on a table showing the relationship between the moisture amount and the development potential Vcont as shown in Table 1, there is selected a required development potential Vcont of 280 V.

TABLE 1

| Moisture amount (g/kg) | 1.0 | 3.0 | 7.6 | 11.5 | 14.5 | 18.6 | 22.0 |
|---|---|---|---|---|---|---|---|
| Dev. potential Vcont (V) | 280 | 260 | 220 | 175 | 160 | 165 | 155 |

The potential Vcont required for the latent image formed on the surface layer of the photoreceptor 1 can be determined by adding a potential Vback for preventing the background fog to the required development potential Vcont. This can be represented by:

Required latent image potential Vcont=Required development potential Vcont+Vback=280 V+200 V =480 V (1)

In the following there will be explained the procedure of setting the charging potential of the photoreceptor and the potential of the exposure portion.

Like the change of the required development potential Vcont by the environmental state, the exposure sensitivity of the photoreceptor 1 changes according to the relative humidity or moisture amount of the circumferential environment, so that the potential of the exposed portion of the photoreceptor 1 has also to be determined matching the environment. FIG. 3 shows the experimental result, in the photoreceptor of the present embodiment, of the change of the relationship between the charged potential and the potential of the exposed portion depending on the environmental moisture amount. The image forming apparatus stores the data of FIG. 3 in the form of a table.

Figure 3:
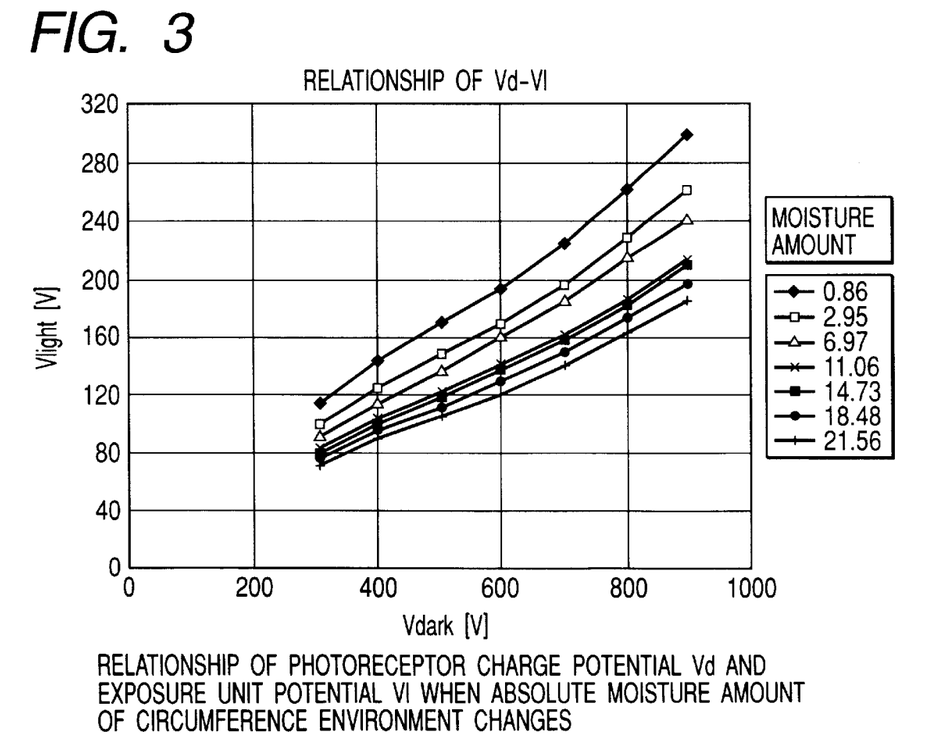
FIG. 3 is a chart showing the relationship between the photoreceptor charge potential Vd and the exposure unit potential V1 when the absolute moisture amount of the circumference environment changes.

In order to obtain the calculated latent image potential Vcont=480 V for the moisture amount of 1.0 (g/kg) obtained from the environment sensor, there is selected a charging potential Vd=700 V based on the result shown in FIG. 3, thereby providing an exposed portion potential V1=220 V and a required latent image potential Vcont=480 V.

As a result, the development potential is set at 500 V by subtracting the potential Vback=200 V of the non-image area from the charging potential Vd=700 V, whereby the calculated required development potential Vcont=280 V can be exactly obtained.

The charging in the present embodiment is achieved by an injection method in which powdered magnetic carrier (resistivity $10^4$ to $10^7$ $\Omega$cm) prepared by crushing or polymerization is carried on a magnetized roller, maintained at a predetermined distance such as 500 to 600 $\mu$m from the surface of the photoreceptor 1, to form a magnetic brush coming into contact with the surface of the photoreceptor 1, under the application of a DC bias voltage superposed with an AC component (1 kHz, Vpp=about 400 V).

In the injection method of the present embodiment, the DC component of the bias of the magnetized roller becomes approximately equal to the charge potential Vd of the photoreceptor, so that there can be assumed a relationship Vdc=Vd.

Figure 4:
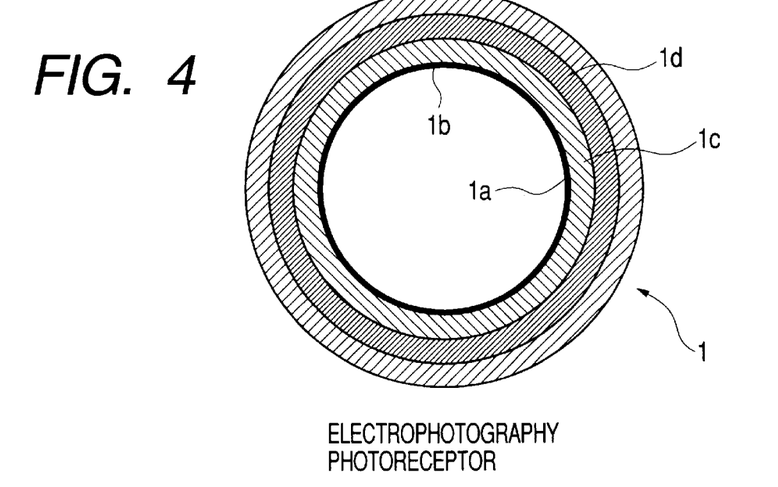
FIG. 4 is a view showing the configuration of an electrophotographic photoreceptor.

The photoreceptor 1 employed in the present embodiment is composed, as shown in FIG. 4, by coating a photoreceptor layer (a charge generating layer 1b, a charge transporting layer 1c and a charge injection layer 1d) on an aluminum cylinder 1a.

The photoreceptor layer has a property of being normally electrically insulating and becoming electrically conductive when irradiated with the light of a specified wavelength. This is because the light irradiation generates positive hole-electron pairs which become carriers for the charge flow.

The developing device 4 is composed of four developing stations 4Y to 4K respectively containing yellow developer, magenta developer, cyan developer and black developer and fixed at predetermined positions opposed to the external peripheries of the photoreceptors 1 with a predetermined distance, for example 300 to 600 $\mu$m, therefrom and develops the latent image utilizing two-component developer. In the present embodiment, there may also be employed other development methods such as magnetic one-component development or contact one-component development instead of the aforementioned two-component development.

On the other hand, a transfer material P contained on a sheet cassette 13A (13B) is fed at an appropriate timing by registration rollers 14 onto the transfer belt 5, and, while being conveyed in a direction indicated by an arrow, transfer voltage applying members 6Y to 6K (hereinafter collectively called 6) positioned under the transfer belt 5 apply transfer voltages to transfer the toner images of the photoreceptor drums 1 onto the transfer material P.

The transfer belt 5 is composed for example of a dielectric sheet, and the transfer material P is attracted thereto by an attraction semiconductive charging roller 15 and a conductive roller. The toner images are transferred in succession from the yellow toner image on the photoreceptor 1Y to the black toner image on the photoreceptor 1K. The transfer material P, bearing the transferred toner images, is conveyed by the transfer belt 5 to a fixing unit 7 for fixation of the toner images by heat and pressure, and is further conveyed to a conveying tray 8.

In the above-described image forming apparatus, by light irradiation of the photoreceptor drums 1Y to 1K with the exposure devices 3Y to 3K, positive hole-electron pairs are generated in the charge generating layer. The positive holes pass through the charge generating layer and recombines with the negative charge in the charge injection layer. Thus the negative charge decreases on the surfacial layer (charge injection layer) of the photoreceptor, whereby the absolute value of the surface potential decreases. In this state the surface potential of the photoreceptor becomes approximately equal to the VL potential.

Figure 5:
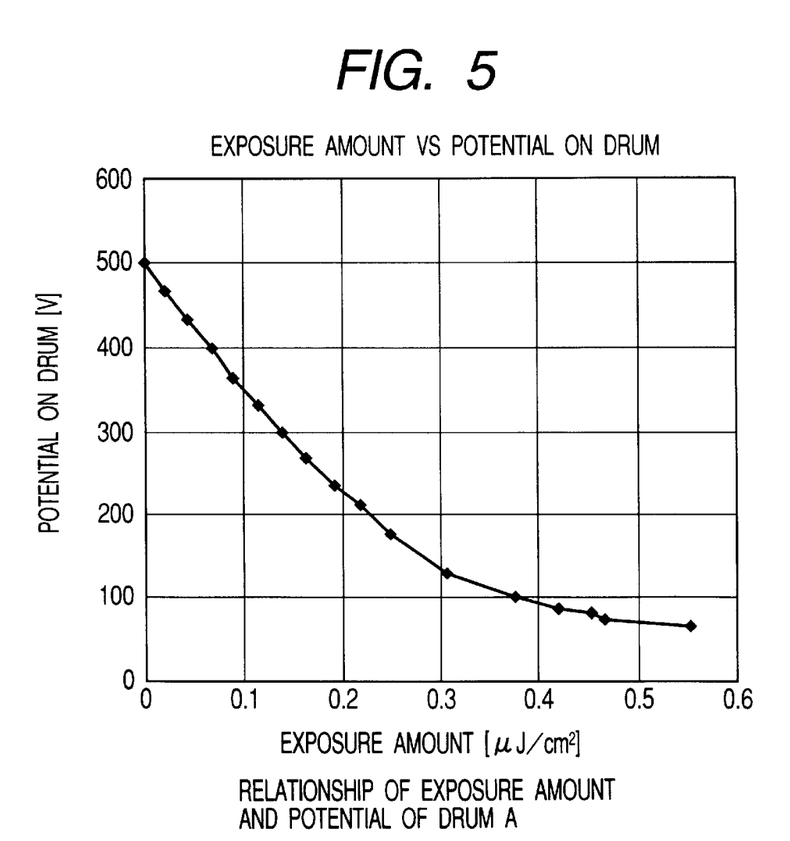
FIG. 5 is a chart showing the relationship between the exposure amount and potential of a drum A.

However, the VL potential attenuating by the exposure on the photoreceptor varies depending on the exposure amount and also on the magnitude of the surface potential. FIG. 5 shows the relationship between the exposure amount E ($\mu$J/cm$^2$) of the photoreceptor A and the potential (V) thereon. As shown in FIG. 5, the potential on the drum non-linearly decreases with an increase in the exposure amount.

Figure 6:
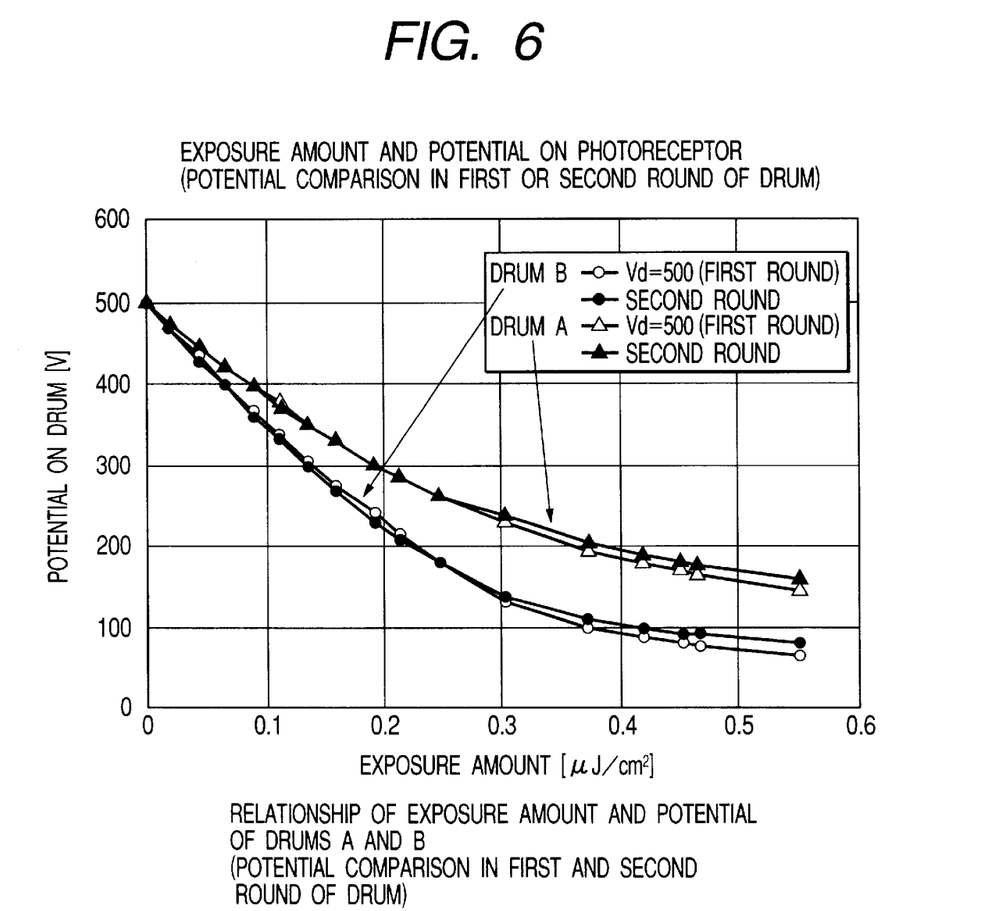
FIG. 6 is a chart showing the relationship between the exposure amount and potential (with comparison of potentials in the first and second rounds (turns, rotations)) of drums A, B.

Also FIG. 6 shows the result of measurement of such E-V characteristics, measured for two rounds of the drum under flush light exposure. FIG. 6 indicates that, with the increase of the exposure amount given to the surfacial layer of the photoreceptor, the VL potential in an already exposed portion (VL potential in the second round) is smaller than that in the first round if the exposure amount is small, but becomes larger than that in the first round if the exposure amount exceeding a certain value. Such fluctuation in the VL potential results in a defective image with a lowered density.

Also a similar experiment conducted on another photoreceptor B with different characteristics of the photoreceptor layer (charge generating layer, charge transporting layer and charge injection layer) provided results similar to those obtained in the photoreceptor A though the E-V characteristics are significantly different.

Figure 7:
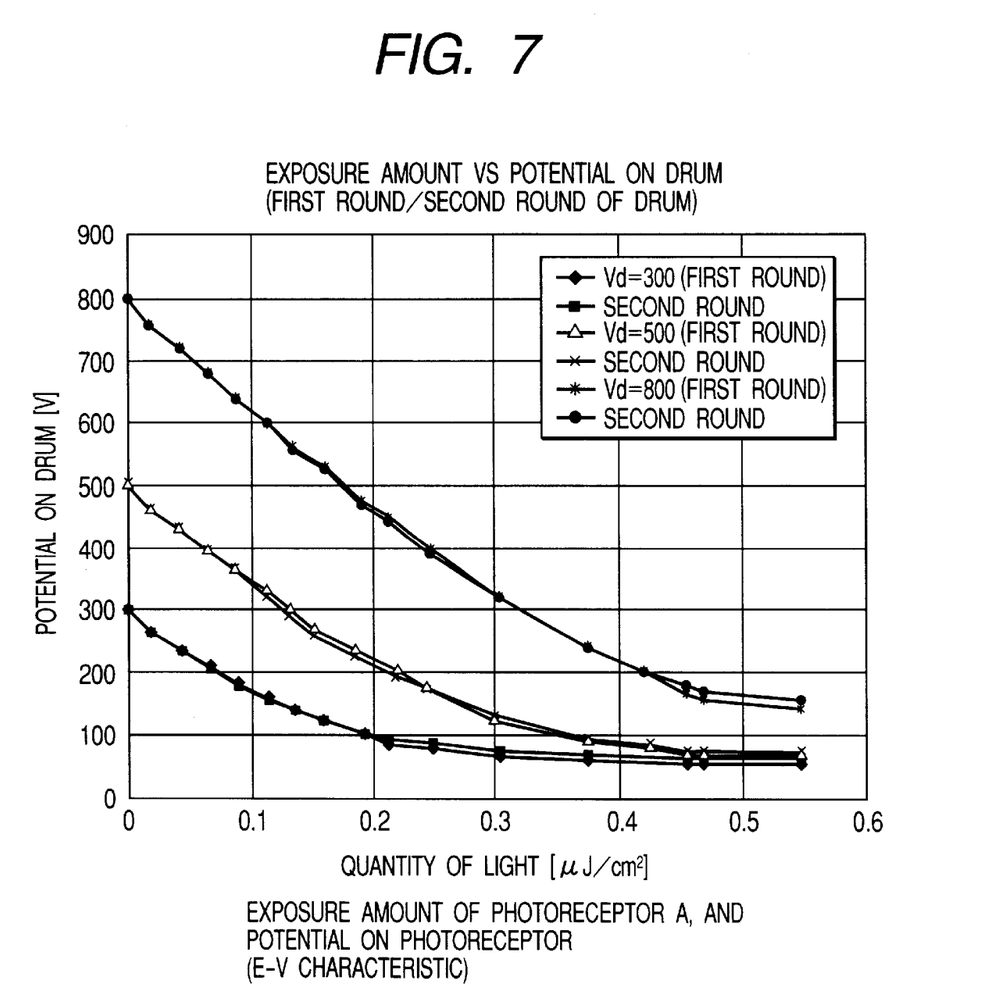
FIG. 7 is a chart showing the relationship between the exposure amount of the photoreceptor A and potential thereon (E-V characteristics)

Also FIG. 7 shows the E-V characteristics when the surface potential (VD) on the photoreceptor is varied. FIG. 7 indicates that the exposure value at which the VL potential at the second round becomes larger than that at the first round increases with the increase of the VD potential.

FIG. 7 also indicates that there exists an area where the value of VL does not change by the exposure memory effect. Also, with the increase in the VD potential, the area where the VL changes little despite of the change in the exposure amount is shifted toward a higher exposure amount and also the area without the change in the VL potential by the exposure memory effect becomes wider.

Based on the foregoing results, it is found that the variation of the VL potential by the exposure hysteresis may increase or may decrease depending on the exposure amount and the surface potential of the drum. It is also found that the area without the variation of the VL potential by the exposure memory effect is always present regardless of the type of the photoreceptor.

Figure 8:
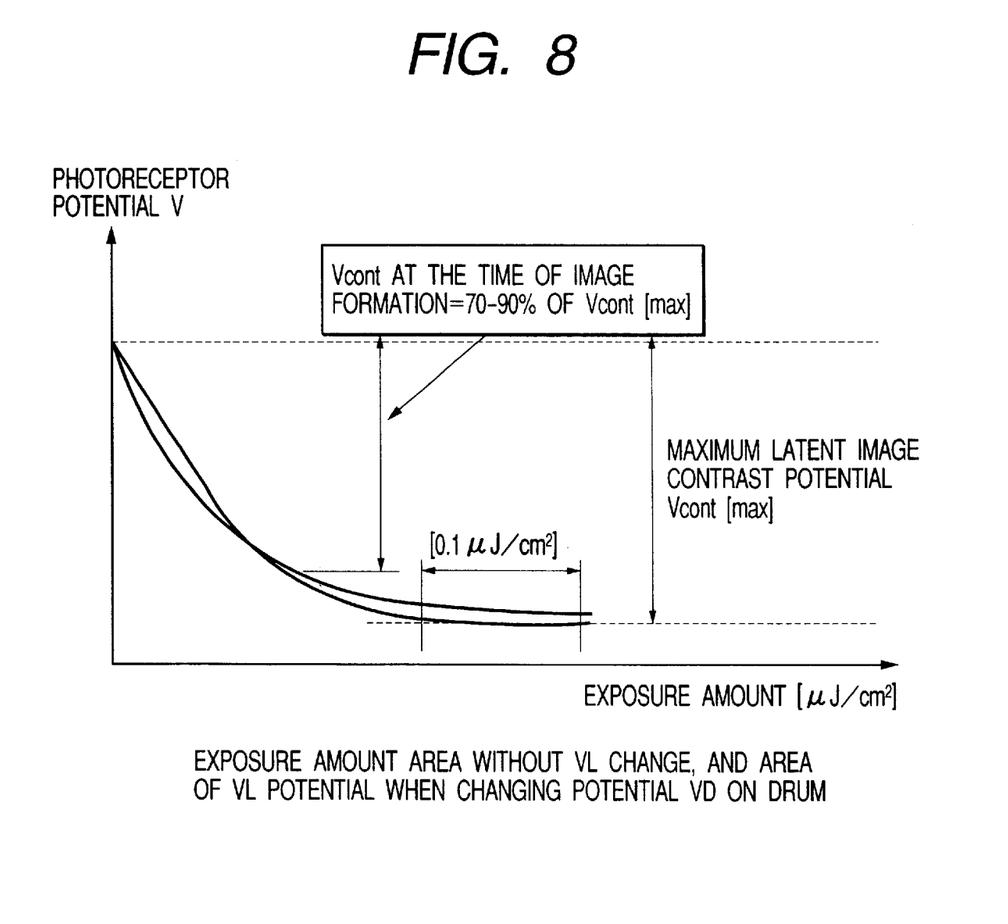
FIG. 8 is a chart showing an exposure amount area without VL change and an area of VL potential when the potential VD on the drum is changed.

FIG. 8 shows an area where the VL potential is stable, based on the foregoing experimental results.

By measuring the relationship between the exposure amount E and the surface potential V in FIG. 8 and taking the area where the potential in the exposed portion changes little as the maximum latent image contrast potential difference while taking the potential difference obtained in a potential change converging area where the potential change for a change in the exposure amount by 0.1 ($\mu$J/cm$^2$) becomes 50 V or less as the maximum latent image contrast potential difference for an arbitrary surface potential, it is found that the stable area where the VL potential does not change by the exposure hysteresis is present within a range of about 70% to 90% of such maximum latent image contrast potential.

Based on the foregoing results, the image forming apparatus of the present invention, in case the photoreceptor generates a ghost image by the exposure hysteresis in the image formation with the normally used exposure amount, changes the exposure amount in such a manner as to change the latent image contrast potential to 60% to 90% of that in the normal condition. For example there is provided, on the operation panel 20 of the image forming apparatus, a selector switch 30 (ghost reduction mode) for reducing the latent image contrast potential to about 70% of the normal setting. However, in case such ghost reduction mode is selected on the operation panel 20, a mere reduction of the exposure amount will reduce the developing contrast thereby decreasing the image density.

In order to resolve such drawback, a table showing the relationship between the surface potential and the VL potential for each environment shown in FIG. 3 is memorized for the exposure amount of the ghost reduction mode, and, when the ghost reduction mode is selected, the charging potential of the photoreceptor and the developing potential of the developing device are immediately changed so as to obtain an image density same as that in the normal exposure amount, whereby there can be achieved an image output same as in the normal condition, without change in the maximum image density.

In the following there will be given, with reference to the image forming apparatus explained in the foregoing, a more detailed explanation on the issues of the present invention and the resolution thereof.

Figure 9:
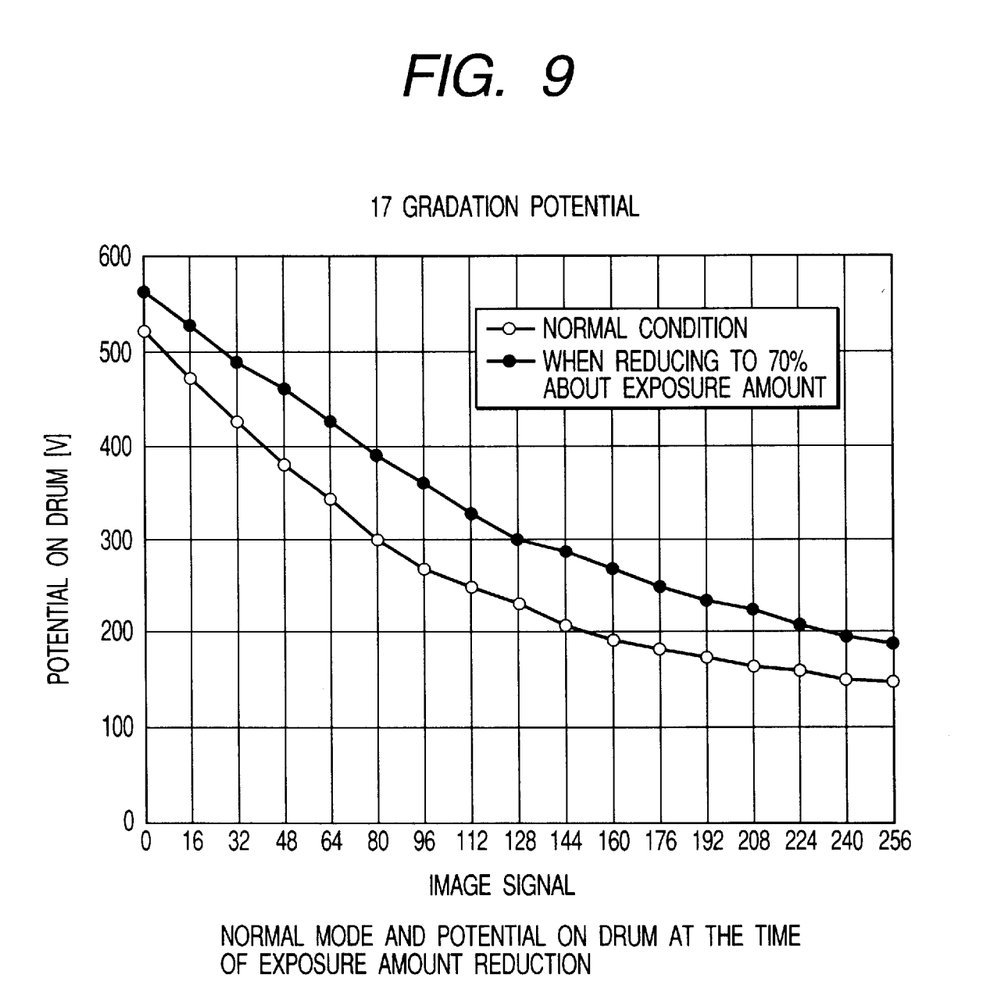
FIG. 9 is a chart showing the potential on the drum in the normal mode and when the exposure amount is reduced.
Figure 10:
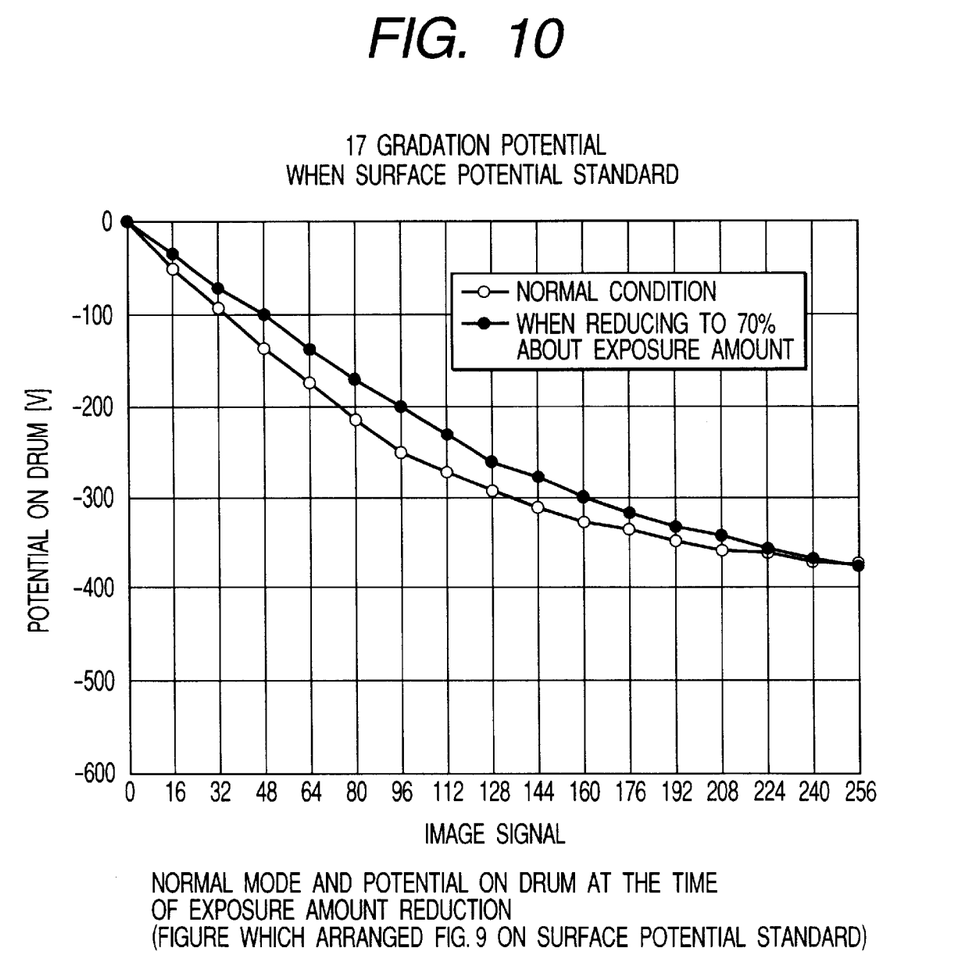
FIG. 10 is a chart showing the potential on the drum in the normal mode and when the exposure amount is reduced (FIG. 9 being normalized with respect to the surface potential standard)

FIG. 9 shows the relationship between the level of the image signal and the surface potential of the photoreceptor at the exposure amount in the normal condition and that in the ghost reduction mode. Also FIG. 10 shows the potential change normalized with respect to the Vd potential. FIG. 10 indicates that, in the latent image formation under a constant maximum latent image contrast potential difference, the latent image contrast potential difference in the intermediate density area becomes smaller than in the exposure amount of the normal condition.

Figure 11:
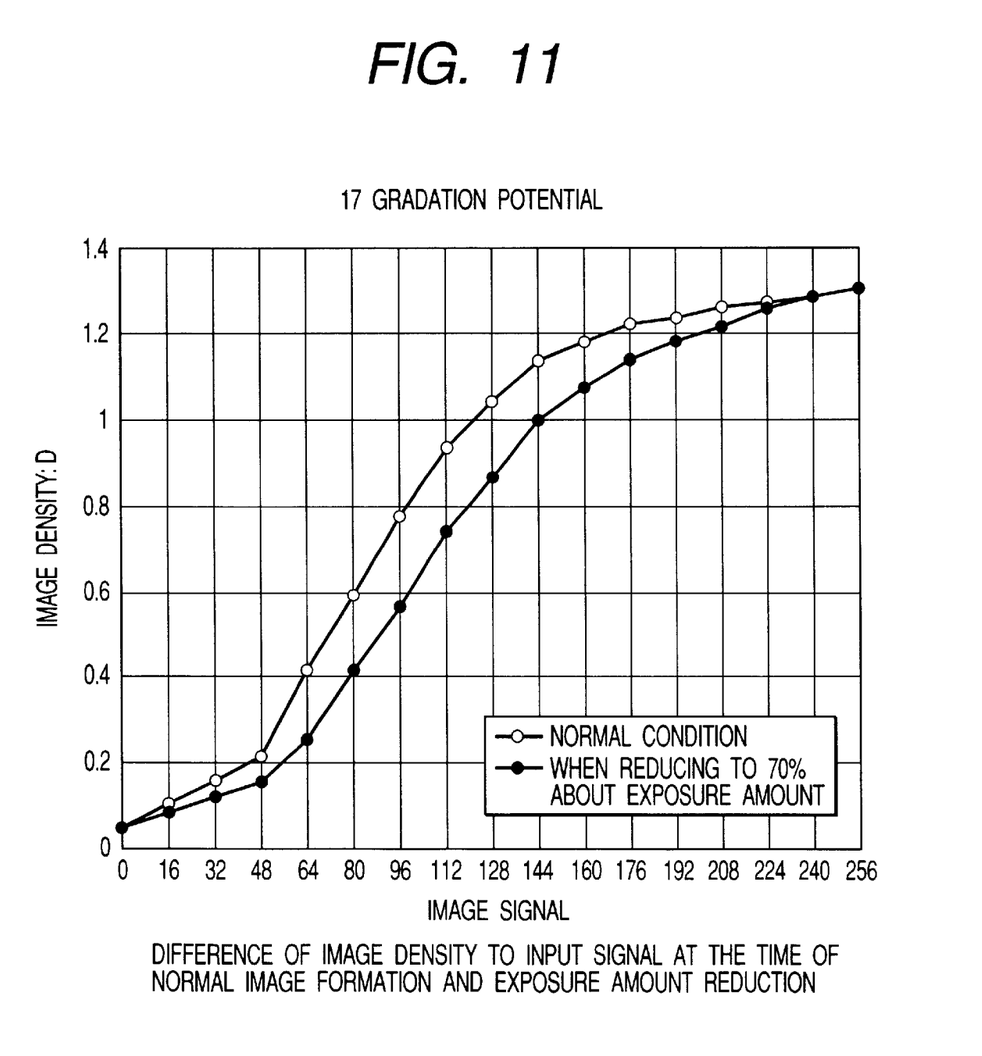
FIG. 11 is a chart showing the difference in the image density for input signals in the normal image formation and in a state where the exposure amount is reduced.

Such potential change results in a change of the intermediate density as shown in FIG. 11.

Figure 12:
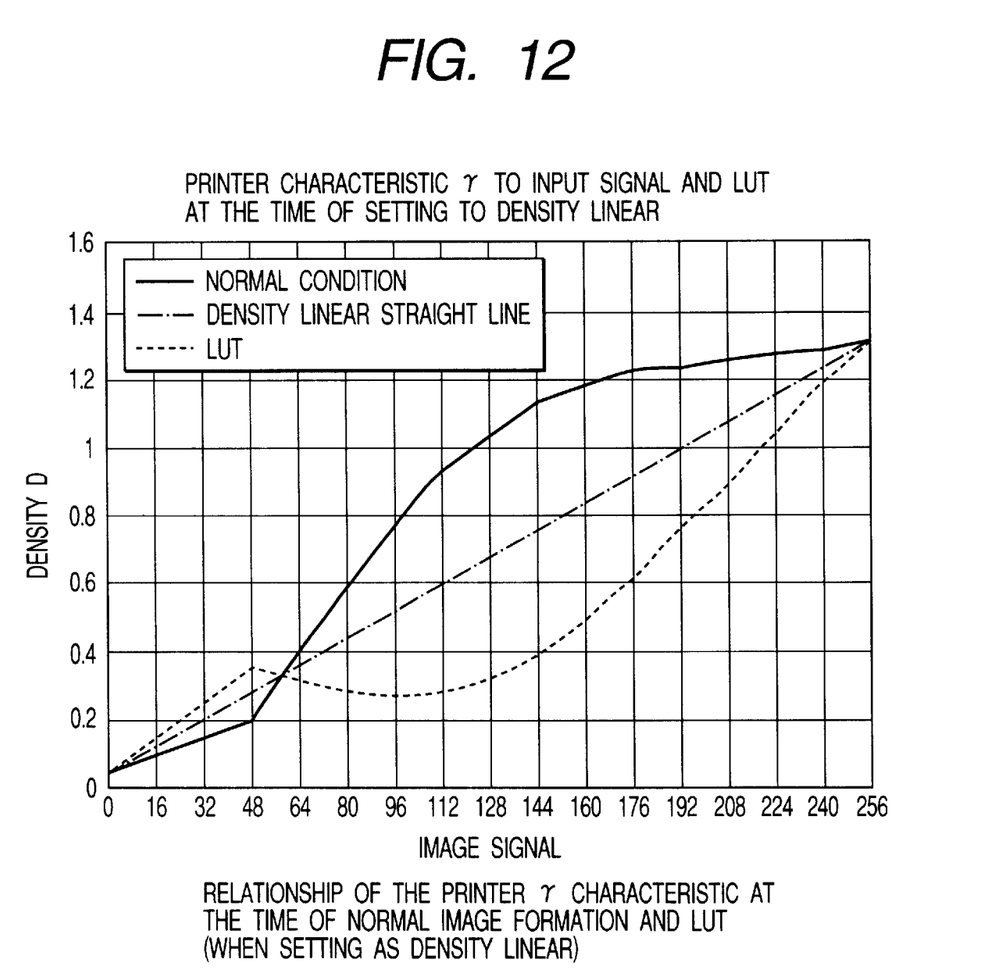
FIG. 12 is a chart showing the relationship between the γ characteristics of the printer and the LUT (set for linear density) in the normal image formation.
Figure 13:
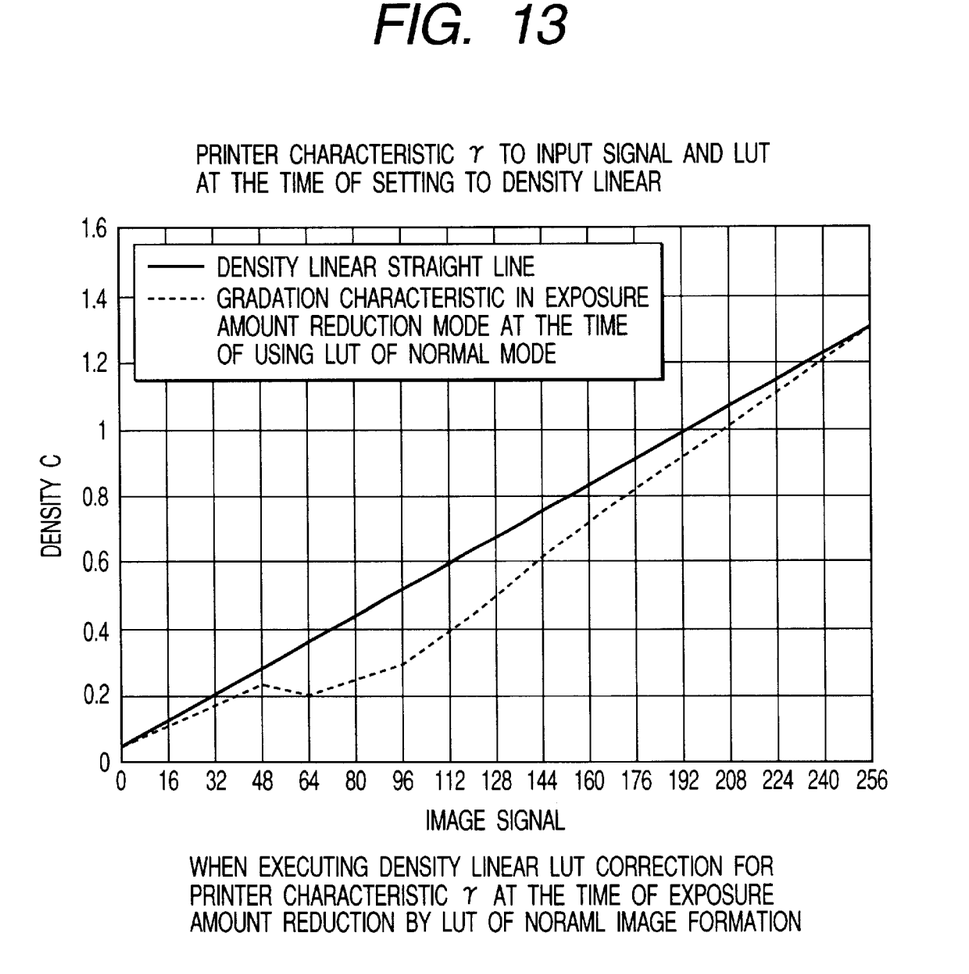
FIG. 13 is a chart showing the density where the γ characteristics of the printer when the exposure amount is reduced is corrected with linear density by the LUT for normal image formation.

Also in case the LUT correction for the γ characteristics of the printer for linear density reproduction in the normal image formation as shown in FIG. 12 is used on the image signal, the influence becomes even larger as shown in FIG. 13, whereby the image density generally becomes lower.

Figure 14:
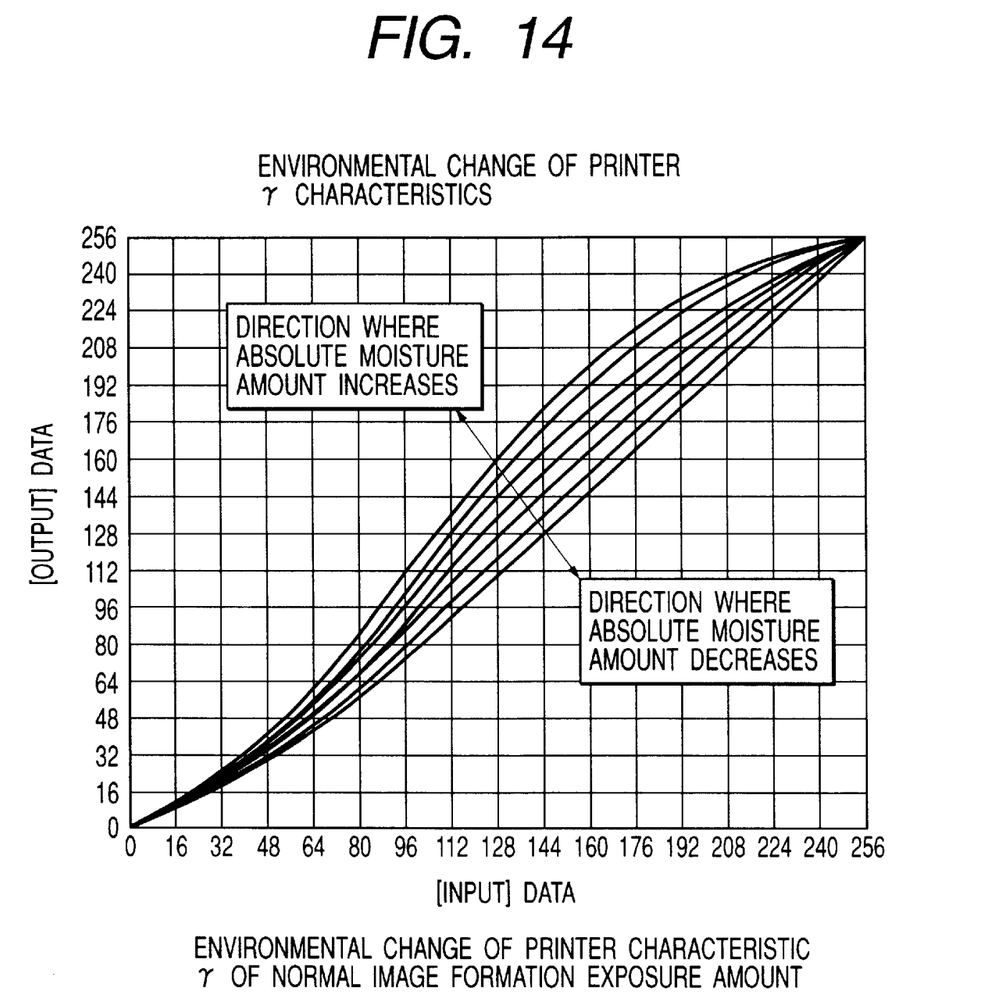
FIG. 14 is a chart showing the environmental change of the γ characteristics of the printer with the exposure amount for the normal image formation.

The image forming apparatus of the present invention memorizes an LUT (FIG. 15) for realizing linear density in the output image for the environmental change (FIG. 14) in the γ characteristics of the printer under the exposure amount in the normal mode, and is provided with a function of automatically adapting to the change in the environmental condition (absolute moisture amount).

Also such LUT data includes plural LUT's corresponding to certain environmental conditions (absolute moisture amount) within the range where the operation of the image forming apparatus is ensured, and interpolation is executed according to the information detected by the environment sensor in the image forming apparatus to calculate an LUT matching the arbitrary environmental condition.

In the present invention, when the exposure reduction mode is selected for reducing the ghost resulting from the exposure hysteresis, a gradation pattern corresponding to the image signal without the LUT correction is outputted and the densities of the gradation levels of such output image are measured by the original reading device in case the image forming apparatus is a copying apparatus or by an external reading device in case the image forming apparatus is a printer.

Based on thus measured data, an LUT as shown in FIG. 12 for the reduced exposure amount is newly prepared. Such LUT is prepared by calculating the difference between the line linear to the density and the density of the gradation level of the read image as shown in FIG. 12. The image formation with thus changed LUT correction amount allows to realize reproduction of the linear intermediate density even under a reduced exposure amount. In the foregoing there has been explained an LUT with linear density relationship, but the present invention is not limited to such LUT with linear density relationship but is applicable to the LUT having any reproduction curve.

Furthermore, when the exposure amount is returned to the normal mode, the image formation can be executed according to the LUT of the normal mode, and the LUT data for the exposure reduction mode are stored in a memory independently from those for the normal image forming mode. Therefore the present invention is featured by a fact that the LUT for correcting the gradation in the exposure reduction mode is newly generated independently from the gradational reproduction in the normal image formation and is used solely when the exposure amount is reduced.

(Embodiment 2)

In the embodiment 2, the basic configuration of the apparatus is same as that of the embodiment 1. In the embodiment 1 the LUT is prepared only for the environmental condition selected in the exposure reduction mode. In contrast, the embodiment 2 is to resolve a drawback that, in case the exposure reduction mode is continuously selected over a long period and the environmental condition in the image forming apparatus changes within such period, the correction of the development condition of the embodiment 1 corrects the maximum image density but the LUT is not changed following such environmental change.

Figure 15:
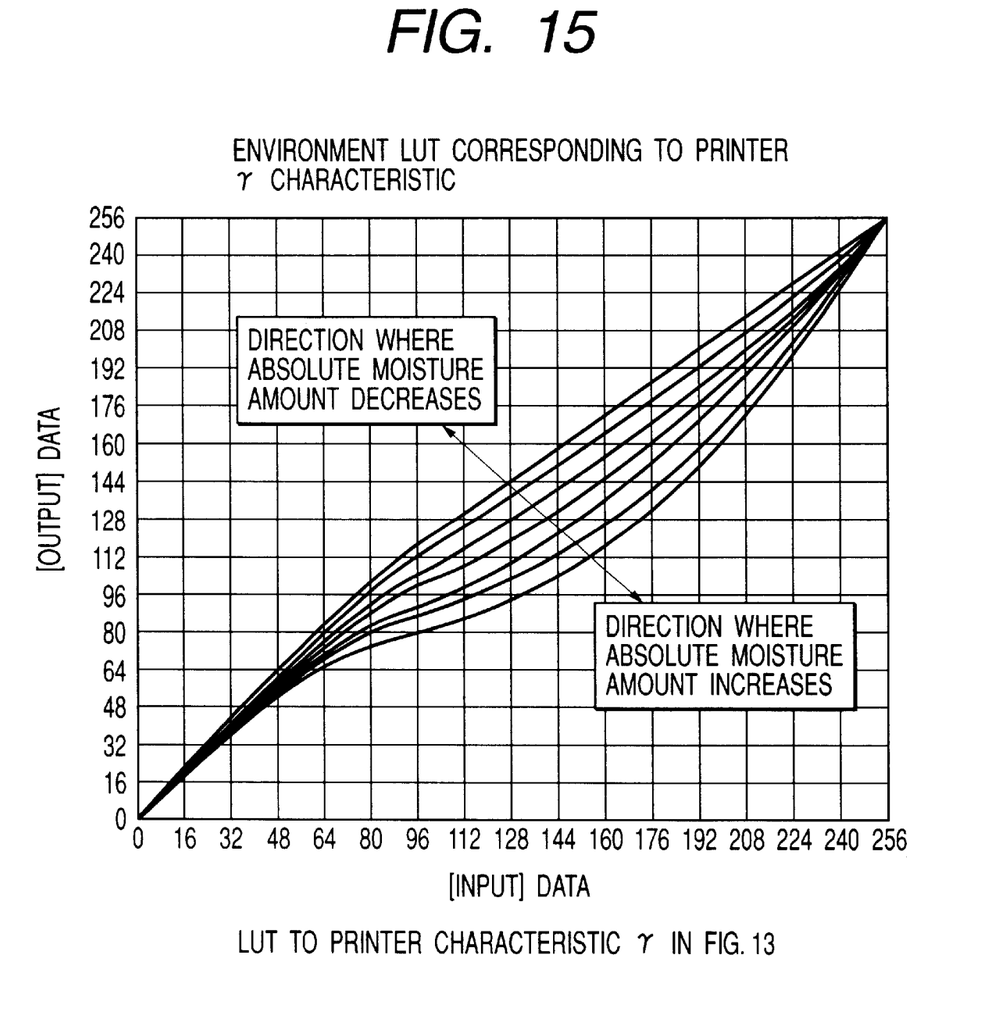
FIG. 15 is a chart showing an LUT for the γ characteristics of the printer shown in FIG. 13.

The image forming apparatus of the present embodiment is featured by being provided with a memory unit for calculating and storing the difference between the LUT data for the exposure reduction mode determined in the embodiment 1 and the LUT data calculated for setting the exposure amount for the normal mode based on the current environmental condition (absolute moisture amount) based on FIG. 15, and by employing a corrected LUT obtained by adding the aforementioned difference data of the LUT to the LUT calculated in the normal mode in case the environmental condition of the image forming apparatus changes from that when the LUT is determined for the exposure reduction mode, thereby maintaining the intermediate density, following the change in the environmental condition.

Also the memory of the difference data allows the image formation in the exposure reduction mode in case such exposure reduction mode is selected again, thereby dispensing with the toil of gradational correction.

(Embodiment 3)

In the embodiment 3, the basic configuration of the apparatus is same as that of the embodiment 1. In the embodiments 1 and 2, the gradational density pattern for LUT correction for the exposure reduction mode is output utilizing the image reading device, then the γ characteristics of the printer are measured through the image forming apparatus itself or through an external image reading device and the LUT is prepared according to the result of such measurement. In contrast, the present embodiment 3 is to resolve a drawback that, upon selecting the ghost reduction mode, the user has to execute a procedure for gradational correction.

The image forming apparatus of the embodiment 3 is featured by storing LUT's corresponding to the environmental variation in the exposure reduction mode in the same manner (FIG. 15) as in the normal condition and automatically executing the gradational correction in case the user switches the image forming mode. Such configuration always enables satisfactory image output at the switching of the image forming mode, without requiring the user to execute the procedure for gradational correction.

(Embodiment 4)

In the embodiment 4, the basic configuration of the apparatus is same as that of the embodiment 1. In the execution of the ghost reduction mode shown in the embodiments 1 to 3, the recent image forming apparatus is often used through a network and the output command is often issued from a computer belonging to the user.

Also such reduction mode need not be always selected in case of outputting for example a character original having a low proportion of the image. It is therefore convenient that the mode can be selected according to the purpose of the user, namely according to the function of the image forming apparatus such as printing function, facsimile function, copying function etc.

Also the convenience for the user can be improved by a configuration in which, in case the user judges that the ghost may be generated, the user can easily select the ghost reduction mode only for the image to be outputted next from a printing dialog image on the PC, thereby achieving the output by the setting specific to the user regardless of the settings for other users.

The image forming apparatus of the present embodiment 4 is featured, in addition to plural image output functions, by having an additional function of independently executing the reduction mode according to the purpose thereby allowing the user to arbitrarily selecting such reduction mode according to the condition of use of the user, and executes change of the developing condition when the exposure reduction mode is selected and automatic LUT correction explained in the embodiment 3, thereby enabling appropriate image output whenever necessary, without requiring the toil of the user.

(Embodiment 5)

In the embodiment 5, the basic configuration of the apparatus is same as that of the embodiment 1. The present embodiment 5 is to further improve the convenience of the embodiment 4. In the embodiment 4 there has been explained a system capable of selecting the exposure reduction mode in the environment of use by the user. In the embodiment 5, communication is made with the exterior of the environment of use of the user through a telephone line, a LAN, an ethernet etc. for monitoring the state of the image forming apparatus from a remote location, whereby a trouble generated in the image forming apparatus or a complaint for a defective image from the user can be coped with for example from a service center of the sales company or the manufacturer.

For this purpose, in case of an inquiry from the user for the image defect in the intermediate density when the ghost reduction mode is selected, the reduction mode can be selected from the remote location for example through network communication, thereby enabling correction on the image quality without requiring the work by the user.

What is claimed is:

1. An image forming apparatus comprising:
    an image bearing member for bearing a latent image;
    a charger for charging said image bearing member;
    exposure means for exposing, to form the latent image, said image bearing member charged by said charger;
    a developing unit for developing the latent image formed on said image bearing member;
    a selecting switch for selecting one of an exposure amount reduction mode for executing image formation by reducing the exposure amount by said exposure means and a normal mode for executing image formation with a normal exposure amount; and
    changing means for changing a correction amount of a look-up table for gradational correction when the exposure amount reduction mode is selected by said selecting switch.

2. An image forming apparatus according to claim 1, wherein said changing means includes a look-up table for the exposure amount reduction mode.

3. An image forming apparatus according to claim 1, wherein said changing means changes the correction amount of the look-up table according to the environmental condition at the time when the exposure amount reduction mode was selected.

4. An image forming apparatus comprising:
    an image bearing member for bearing a latent image;
    a charger for charging said image bearing member;
    exposure means for exposing, to form the latent image, said image bearing member charged by said charger;
    a developing unit for developing the latent image formed on said image bearing member;
    a selecting switch for selecting one of an exposure amount reduction mode for executing image formation by reducing the exposure amount by said exposure means and a normal mode for executing image formation with a normal exposure amount; and
    changing means for changing a correction amount of a look-up table for gradational correction when the exposure amount reduction mode is selected by said selecting switch,
    wherein the exposure amount reduction mode switches to an exposure amount for obtaining a potential difference of 60% to 90% of the maximum potential difference of the latent image obtained on said image bearing member in the exposure amount of the normal mode.

5. An image forming apparatus comprising:
    an image bearing member for bearing a latent image;
    a charger for charging said image bearing member;
    exposure means for exposing, to form the latent image, said image bearing member charged by said charger;
    a developing unit for developing the latent image formed on said image bearing member;
    a selecting switch for selecting one of an exposure amount reduction mode for executing image formation by reducing the exposure amount by said exposure means and a normal mode for executing image formation with a normal exposure amount; and
    changing means for changing a correction amount of a look-up table for gradational correction when the exposure amount reduction mode is selected by said selecting switch,
    wherein said changing means changes the correction amount of the look-up table by measuring the density of a predetermined test pattern image formed under a condition of a reduced exposure amount.

6. An image forming apparatus comprising:

an image bearing member for bearing a latent image;

a charger for charging said image bearing member;

exposure means for exposing, to form the latent image, said image bearing member charged by said charger;

a developing unit for developing the latent image formed on said image bearing member;

a selecting switch for selecting one of an exposure amount reduction mode for executing image formation by reducing the exposure amount by said exposure means and a normal mode for executing image formation with a normal exposure amount; and changing means for changing a correction amount of a look-up table for gradational correction when the exposure amount reduction mode is selected by said selecting switch, wherein said image bearing member is a photoreceptor having a charge injection layer on the surface, and said charging means executes charge injection with a brush formed by magnetic particles on a magnet sleeve.

7. A control method for an image forming apparatus, comprising:

a charging step of charging an image bearing member for bearing a latent image;

an exposure step of exposing, to form the latent image, the image bearing member charged in said charging step;

a developing step of developing the latent image formed on the image bearing member;

a selecting step of selecting one of an exposure amount reduction mode for executing image formation by reducing the exposure amount in said exposure step and a normal mode for executing image formation with a normal exposure amount; and a changing step of changing the correction amount of a look-up table for gradational correction when the exposure amount reduction mode is selected in said selecting step.

8. A control method for an image forming apparatus, comprising:

a charging step of charging an image bearing member for bearing a latent image;

an exposure step of exposing, to form the latent image, the image bearing member charged in said charging step;

a developing step of developing the latent image formed on the image bearing member;

a selecting step of selecting one of an exposure amount reduction mode for executing image formation by reducing the exposure amount in said exposure step and a normal mode for executing image formation with a normal exposure amount; and a changing step of changing the correction amount of a look-up table for gradational correction when the exposure amount reduction mode is selected in said selecting step, wherein the exposure amount reduction mode switches to an exposure amount for obtaining a potential difference of 60% to 90% of the maximum potential difference of the latent image obtained on the image bearing member in the exposure amount of the normal mode.

9. A control method for an image forming apparatus, comprising:

a charging step of charging an image bearing member for bearing a latent image;

an exposure step of exposing, to form the latent image, the image bearing member charged in said charging step;

a developing step of developing the latent image formed on the image bearing member;

a selecting step of selecting one of an exposure amount reduction mode for executing image formation by reducing the exposure amount in said exposure step and a normal mode for executing image formation with a normal exposure amount; and a changing step of changing the correction amount of a look-up table for gradational correction when the exposure amount reduction mode is selected in said selecting step, wherein the correction amount of the look-up table is changed in said changing step by measuring the density of a predetermined test pattern image formed under a condition of a reduced exposure amount.

10. A control method for an image forming apparatus, comprising:

a charging step of charging an image bearing member for bearing a latent image;

an exposure step of exposing, to form the latent image, the image bearing member charged in said charging step;

a developing step of developing the latent image formed on the image bearing member;

a selecting step of selecting one of an exposure amount reduction mode for executing image formation by reducing the exposure amount in said exposure step and a normal mode for executing image formation with a normal exposure amount; and a changing step of changing the correction amount of a look-up table for gradational correction when the exposure amount reduction mode is selected in said selecting step, wherein the image bearing member is a photoreceptor having a charge injection layer on the surface, and the charging means executes charge injection with a brush formed by magnetic particles on a magnet sleeve.

* * * * *